No. 851,557. PATENTED APR. 23, 1907.
D. C. PASLEY.
END GATE FASTENER.
APPLICATION FILED DEC. 1, 1906.
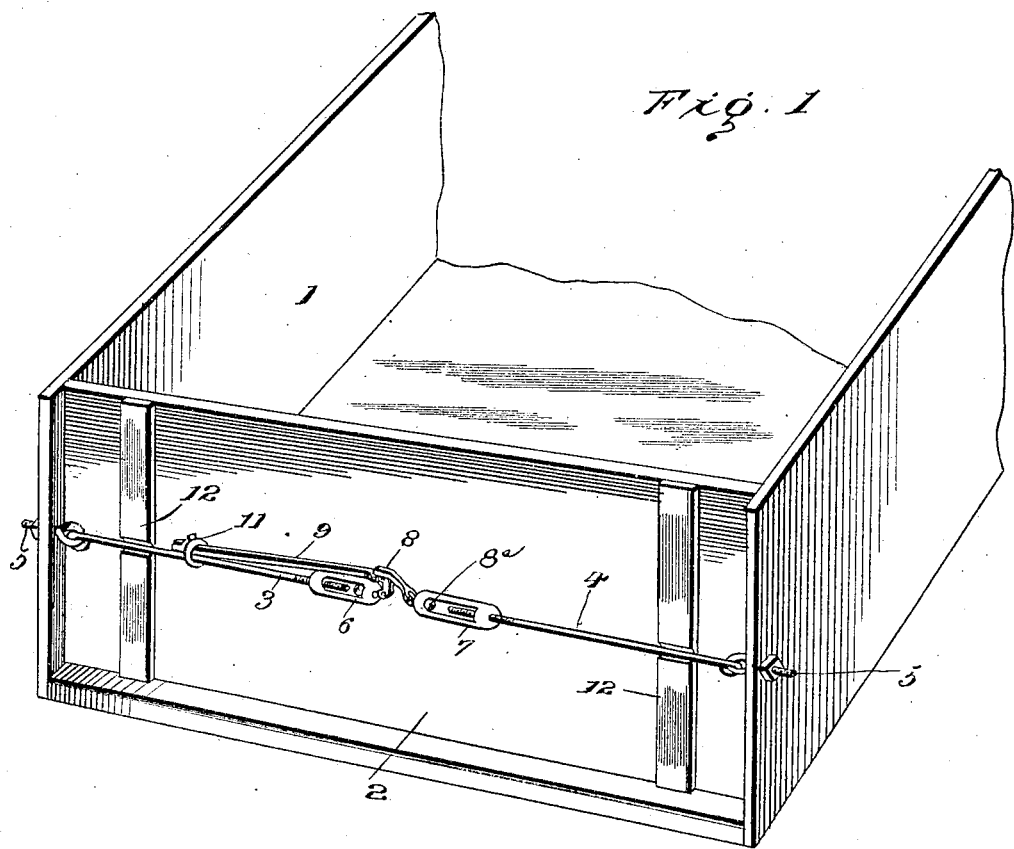
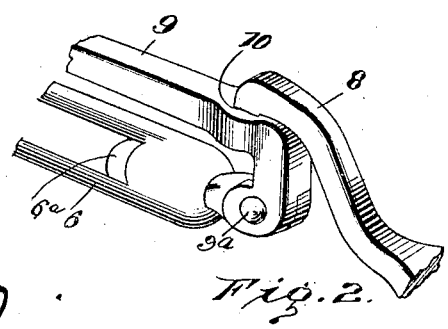
Inventor
D. C. Pasley.

UNITED STATES PATENT OFFICE.

DECATUR C. PASLEY, OF DOLLIVER, IOWA.

END-GATE FASTENER.

No. 851,557.　　　Specification of Letters Patent.　　　Patented April 23, 1907.

Application filed December 1, 1906. Serial No. 345,951.

*To all whom it may concern:*

Be it known that I, DECATUR C. PASLEY, a citizen of the United States, residing at Dolliver, in the county of Emmet and State of Iowa, have invented certain new and useful Improvements in End-Gate Fasteners, of which the following is a specification.

The object of my invention is to provide an improved construction of end gate fastener, which will be durable and composed of comparatively few and simple parts that may be readily applied to any ordinary type of wagon body and end gate, and which may be adjusted so as to accommodate itself for wagon bodies of different widths.

With this and other objects in view, as will more fully appear as the description proceeds, the invention consists in certain constructions and arrangements of the parts herein described and particularly pointed out in the appended claims.

For a full understanding of the invention and the merits thereof and also to acquire a knowledge of the details of construction and the means for effecting the result, reference is to be had to the following description and accompanying drawings, in which:

Figure 1 is a perspective view of an end gate with my improvement applied thereto. Fig. 2 is a detail perspective view of a portion of the fastener.

Corresponding and like parts are referred to in the following description and indicated in all the views of the drawings by the same reference characters.

Referring to the drawing, the numeral 1 designates the side boards of a wagon body and 2 the end gate thereof.

3 and 4 designate the respective stay rods of my improved end gate fastener, the same being secured to the rear ends of the side boards 1, preferably by means of eye bolts 5 so that the stay rods may have a freely swinging movement and be dropped down out of the way when it is desired to remove the end gate.

The stay rods 3 and 4 are provided at their inner ends with shackle members or yokes, designated 6 and 7, respectively, and screwing on the said ends so that they may be backed up upon the stay rods or extended thereon in order to accommodate said stay rods to end gates of different lengths or wagon bodies of different widths. The yoke 7 is provided at one end with a swivel bolt 8$^a$ to the outer end of which a hook 8 is pivoted. The other yoke 6 is provided with a similar bolt 6$^a$ on the outer end of which a lever 9 is fulcrumed, as by a pintle 9$^a$. The lever 9 is formed between its ends with a socket 10 adapted to receive the free end of the hook 8, and said lever 9 is angular as shown.

From the foregoing description in connection with the accompanying drawing, it is manifest that when the end gate is in position, it may be securely fastened in place by first adjusting the shackle members or yokes 6 and 7 properly upon the stay rods 3 and 4, and the attendant then inserts the hook 8 in the socket 10 of the lever 9 and swings the latter backwardly upon its fulcrum, which obviously draws the two stay rods tightly together, the hook 8 snapping past the center. To insure that the lever 9 shall remain in its locked position, I preferably provide a slip ring 11 on the stay rod 3, said ring being adapted to be placed over the free end of the lever 9 so as to secure this end of the lever to the stay rod 3 and prevent the accidental release of said lever. Preferably the outer side of the end gate 2 is provided with grooved cleats 12 adapted to receive the stay rods 3 and 4 so as to prevent the end gate from working up after it has been fastened in place.

It will be seen that I have provided a very simple end gate fastener which may be adjusted according to the different widths of wagon bodies and which is durable in construction as well as efficient in operation and one that can be readily fastened and unfastened.

Having thus described the invention, what is claimed as new is:

The combination with the side boards and end gate of a wagon body, of stay rods secured at their outer ends to the rear ends of the side boards and adapted to extend inwardly towards each other, yokes mounted to screw upon the inner ends of said stay rods, swivel bolts mounted in the ends of said yokes, a hook pivotally connected to the outer end of one of said swivel bolts, and a lever fulcrumed on the outer end of the other swivel bolt and provided with a socket adapted to receive the free end of said hook.

In testimony whereof I affix my signature in presence of two witnesses.

DECATUR C. PASLEY. [L. S.]

Witnesses:
　R. P. SINCLAIR,
　J. C. ROLLINS.